Jan. 13, 1925. 1,522,570

F. H. ALEXANDER

SEXTANT

Filed Dec. 12, 1922 4 Sheets-Sheet 1

Inventor.
Francis H. Alexander
By Julian C. Dowell
his attorney

Jan. 13, 1925.

F. H. ALEXANDER 1,522,570

SEXTANT

Filed Dec. 12, 1922

4 Sheets-Sheet 2

Inventor.
Francis H. Alexander
By Julian C. Dowell
his attorney

Jan. 13, 1925.

F. H. ALEXANDER 1,522,570

SEXTANT

Filed Dec. 12, 1922    4 Sheets-Sheet 3

Inventor,
Francis H. Alexander
By Julius C. Dowell
his attorney

Jan. 13, 1925.

F. H. ALEXANDER

SEXTANT

Filed Dec. 12, 1922    4 Sheets-Sheet 4

1,522,570

Inventor.
Francis H. Alexander
By Julian C. Dowell
his attorney

Patented Jan. 13, 1925.

1,522,570

UNITED STATES PATENT OFFICE.

FRANCIS HERBERT ALEXANDER, OF NEWCASTLE-ON-TYNE, ENGLAND, ASSIGNOR TO FRANCIS HERBERT ALEXANDER AND JOHN WILSON GILLIE, BOTH OF NORTH SHIELDS, NORTHUMBERLAND, ENGLAND.

SEXTANT.

Application filed December 12, 1922. Serial No. 606,477.

*To all whom it may concern:*

Be it known that I, FRANCIS HERBERT ALEXANDER, a subject of the King of Great Britain and Ireland, residing at Jesmond, Newcastle-on-Tyne, England, have invented Improvements in or Relating to Sextants, of which the following is a specification.

This invention relates to sextants wherein use is made of an artificial horizon and it has for its object to provide improved arrangements for enabling observations to be made with substantially the same facility and accuracy, notwithstanding slight movements of the sextant, as when the natural or sea horizon is used.

The artificial horizon is constituted by a datum line which whilst it may alter in position with movement of the sextant, is so arranged that the path of the rays therefrom to the eye includes or passes closely adjacent to the oscillation axis of a long period pendulum clinometer. In this way it will be found easier to ensure that the datum line image which appears shall persist alongside the mirrored image of the celestial object under observation when the latter is brought down into the field of vision of the observer, and the usual contact of images effected.

The datum line rays referred to may be diverted by a mirror the reflecting surface of which contains the oscillation axis of the pendulum and moves with the latter, the said datum line being viewed indirectly through additional optical elements; or the datum line rays may be intercepted by the eye applied at or near the oscillation axis of the clinometer pendulum.

The clinometer may take various forms, may have the means for viewing the datum line variously associated therewith and may in turn be incorporated in or combined with the sextant in sundry ways to suit different requirements and conditions, a variation in any one of which may involve a modification in one or more of the others.

The datum line for the artificial horizon is formed upon some part of the movable element of the clinometer referred to.

Figure 1:
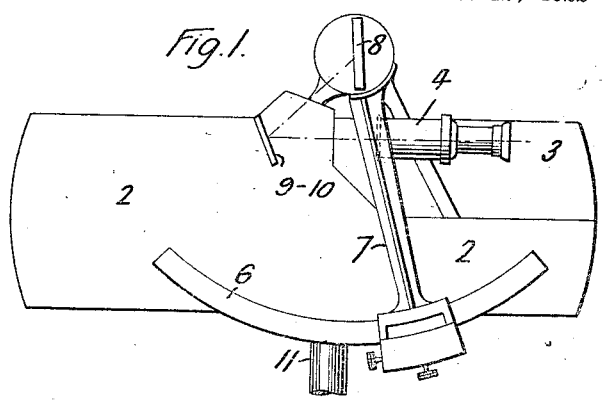
Figure 5:
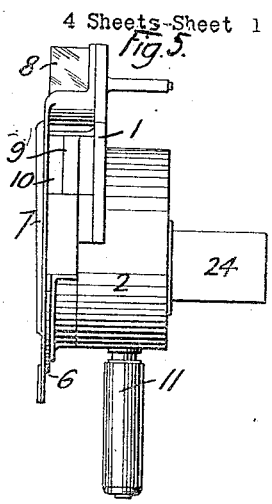
Figure 2:
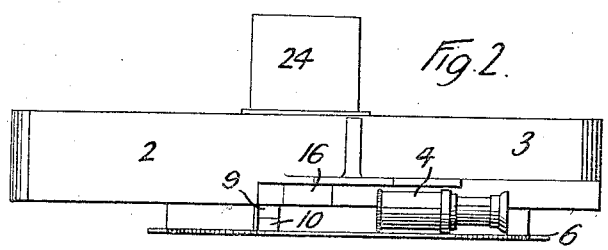
Figure 3:
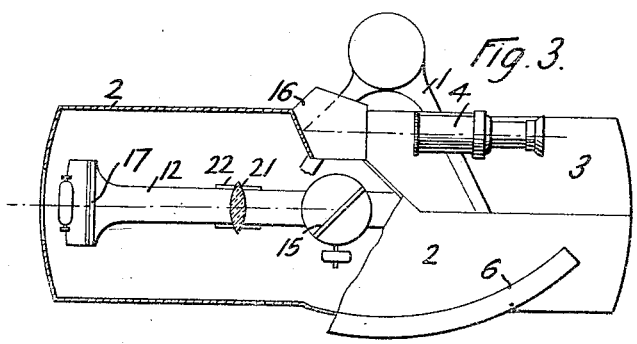
Figure 6:
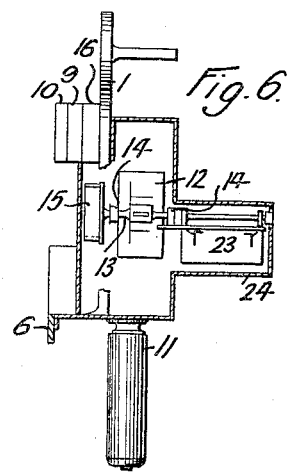
Figure 4:
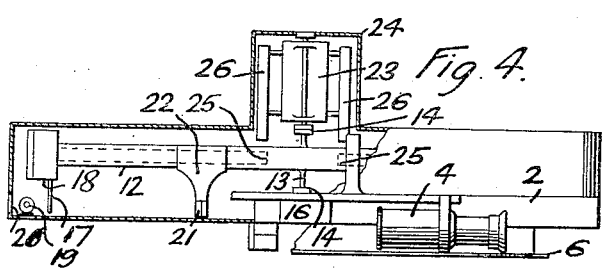
Figure 7:
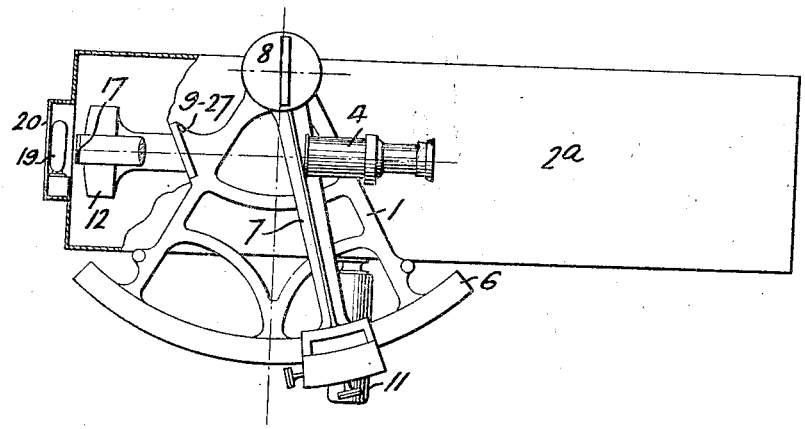
Figure 8:
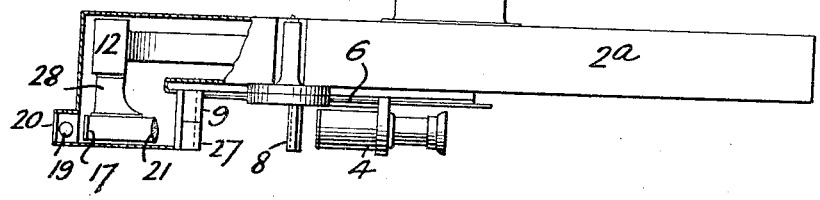
Figure 9:
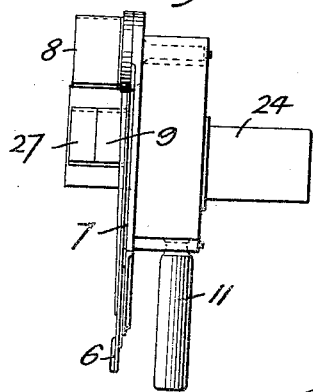
Figure 10:
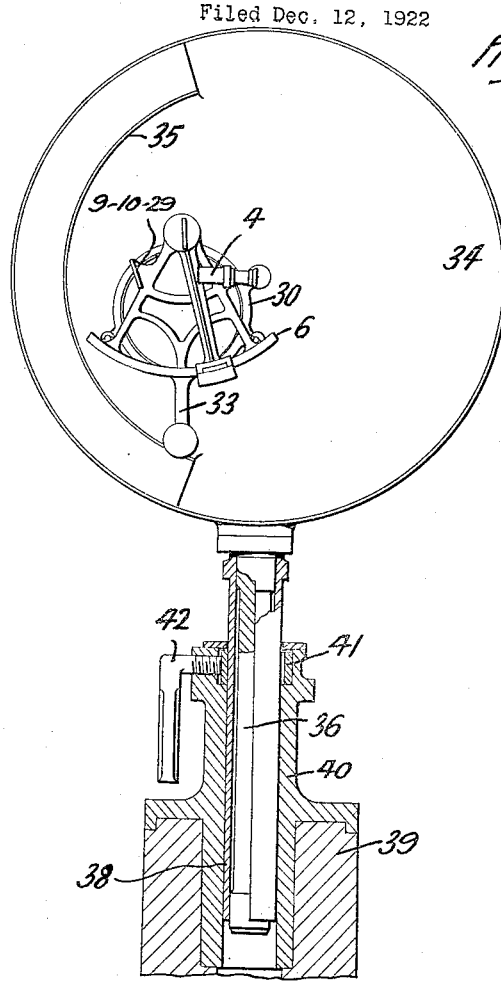
Figure 11:
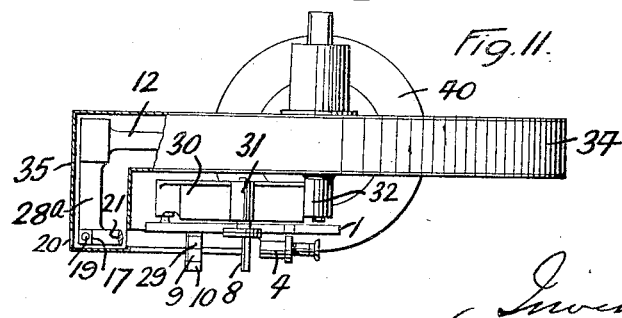
Figure 12:
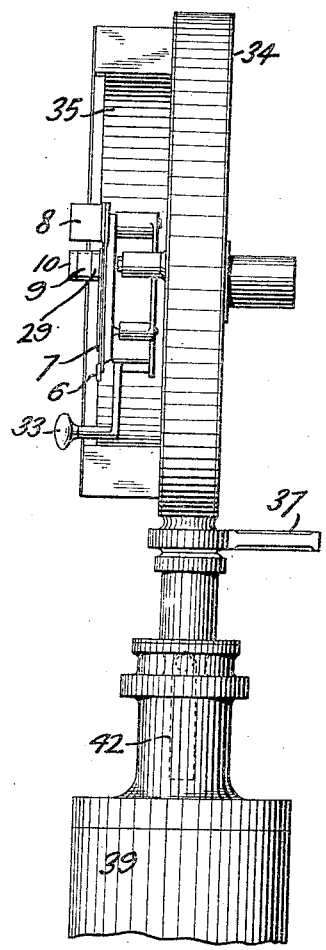
Figure 13:
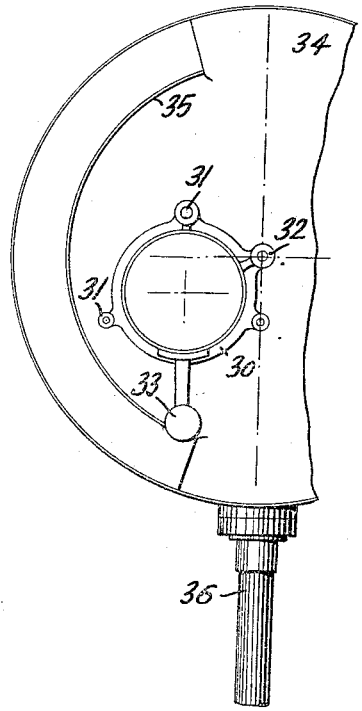
Figure 14:
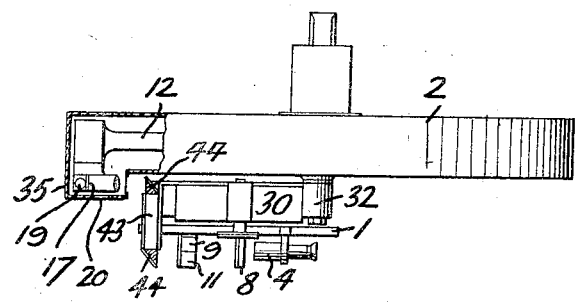

In the accompanying drawings three different arrangements embodying the invention are illustrated, Figs. 1 and 2 being an elevation and plan, Figs. 3 and 4 a part sectional elevation and plan and Figs. 5 and 6 an end and part sectional end elevation, of one form of instrument, certain parts being removed. Figs. 7, 8 and 9 are views similar to Figs. 3, 4 and 5 of a second form of instrument. Fig. 10 is a part sectional elevation, Fig. 11 a plan also partly in section and Fig. 12 an end elevation of an arrangement in which a clinometer and sextant separable one from the other are employed. Fig. 13 is a view similar to Fig. 10 showing the sextant removed. Fig. 14 is a view similar to Fig. 11 illustrating a modification.

Referring first to Figs. 1 to 6, a sextant is employed part of the frame 1 of which extends into the wider portion 2 of a totally closed case, the narrower portion 3 of the case being set back as shown in Fig. 5 in order to exclude a portion of the sextant frame and enable the eye to be more readily applied to the telescope 4. The graduated arc 6 is also external to the case 2, 3, the radius arm 7 which works over it and which carries the index glass 8 being cranked to clear the horizon glass comprising the part 9 reflecting the celestial object and the clear part 10 for observing the natural horizon. 11 is the handle of the instrument upon which the case is mounted.

12 is a long period pendulum the spindle 13 of which is freely movable in bearings 14, within the case, 15 being a mirror mounted upon an extension of the spindle 13 so that its reflecting surface contains the axis of the pendulum. 16 is a double reflecting prism associated with the telescope 4 and mirror 15. The datum mark or line indicated at 17 may be marked upon or produced as by masking a translucent membrane carried by a bracket 18 from the pendulum 12. Behind said bracket an illuminant 19 is arranged for use in darkness, the datum line at other times being rendered visible by light admitted through a window 20 in the case. 21 is a collimating lens carried by a bracket 22 from the pendulum 12. Other portions of the clinometer, which form no part per se of the present invention but which are shown, comprise an auxiliary pendulum 23 suspended, in the case extension 24, coaxially with but independently of the pendulum 12, magnets 25 on the latter and magnets 26 on the pendulum 23.

The disposition of the parts is such that the oscillation axis of the pendulum arrangement is located between the axis of the radius arm 7 and the graduated arc 6.

As will be obvious minor modifications may be adopted it being permissible for example to employ in lieu of the prism 16 mirrors occupying the positions of the reflecting surfaces of the latter.

A simplified instrument in which the datum mark is directly visible through the telescope 4 is that shown in Figs. 7, 8 and 9 where the pendulum case 2ª is combined with an ordinary sextant having a horizon glass clear part 27 in which the datum mark appears alongside the reflection of the celestial object in the horizon glass part 9. In this example the member constituting the datum mark 17 and the collimating lens 21 are carried by one and the same bracket 28 from the pendulum.

In the arrangement shown in Figs. 10 to 13 the sextant and the clinometer case are not directly connected together the intention being to enable the sextant to be removed and stored as usual leaving the clinometer in situ upon the deck of a ship for example, which in view of the more delicate nature of its construction is more advantageous.

As here shown the sextant, which may be of any ordinary or usual form, except that it has an additional clear portion 29 in the horizon glass for use with the artificial horizon, is removably attached to a holder 30 as by inserting its supporting feet into the socketed lugs 31. This holder has a lug 32 so positioned that when mounted upon a pivot coaxial with the axis of the clinometer pendulum, the telescope necessitates application of the eye at substantially the axis aforesaid. 33 is a handle by which the holder 30 is angularly adjusted about its pivot to keep the horizon datum line in view when necessary. The clinometer case 34 is shown as cylindrical in shape with a segmental side extension 35 to accommodate a pendulum bracket 28ª which in this instance carries not only the collimating lens 21, and the datum mark 17 but also the illuminant 19.

For the purpose of supporting the clinometer, the case 34 may be attached as shown to a shaft 36 rotatable, as by a handle 37, within a sleeve 38 supported from a pedestal 39 by a fitting 40. The sleeve 38 is adjustable as to height in said fitting by means of a clamping collar 41 under the control of a handled set screw 42.

In some cases it may be desired to employ a sextant the horizon glass of which is in no way altered. This can be done by reducing the width of the case extension 35 as shown in Fig. 14 so that it does not overlap the index glass 8, and attaching to the holder 30 a periscope 43 comprising prisms 44 or mirrors whereby the image of the datum mark 17 is so reflected that it can be seen by the observer at the telescope through the glass 11 ordinarily adapted for viewing the natural horizon.

From these examples other modifications will be readily ascertainable without specific direction.

What I claim is:—

1. The combination, with a sextant, having an eye-piece, of a support, a clinometer having a long period pendulum and a member movable with said pendulum having a single datum "mark" serving as an artificial horizon, the sextant and clinometer being arranged on said support in such a manner that the oscillation axis of the pendulum is located between the datum mark and sextant eyepiece closely adjacent to the path of the observed rays from the datum mark, substantially as described.

2. The combination, with a sextant, having an eye-piece, of a support, a clinometer having a long period pendulum and a member movable with said pendulum having a single datum "mark" serving as an artificial horizon, the sextant and clinometer being arranged on said support in such a manner that the oscillation axis of the pendulum is located between the datum mark and sextant eye piece and in the path of the observed rays from the datum mark, substantially as described.

3. In combination, a support, a clinometer having a long period pendulum, carrying a single datum "mark" serving as an artificial horizon and a sextant having a telescope, said clinometer and sextant being arranged on said support in such a manner that the oscillation axis of the pendulum is located in the path of the observed rays proceeding from the datum mark to the telescope, with the eye piece of the telescope substantially at such centre of oscillation, substantially as described.

4. In combination, a pendulum clinometer having an artificial horizon and comprising a casing, a support for stationarily holding said casing, a sextant for use with the clinometer aforesaid and means whereby the sextant can be attached to and removed from the clinometer casing, the latter being adapted to remain at all times upon its support, substantially as described.

5. In combination, a pendulum clinometer having an artificial horizon and comprising a casing, a support for stationarily holding said casing, a sextant for use with the clinometer aforesaid and means whereby the sextant can be temporarily attached to the clinometer casing and bodily adjusted thereon whilst in use.

6. In combination, a pendulum clinometer having an artificial horizon and comprising a casing, a support upon which the casing can be adjusted as to position and adapted to stationarily hold the same, a sextant for use with the clinometer aforesaid and means whereby the sextant can be attached to and removed from the clinometer casing, the latter being adapted to remain at all times upon its support, substantially as described.

7. In combination, a pendulum clinometer having an artificial horizon and comprising a casing, a pedestal, means adapted to stationarily support the casing upon the pedestal, means whereby the height of casing can be adjusted, a sextant for use with the clinometer aforesaid and means whereby the sextant can be temporarily attached to the clinometer and bodily adjusted thereon whilst in use.

8. In combination, a pendulum clinometer having an artificial horizon and comprising a casing, a pedestal, means adapted to stationarily support the casing upon the pedestal, means whereby the height of casing can be adjusted, means whereby the same can be angularly adjusted about a vertical axis, a sextant for use with the clinometer aforesaid and means whereby the sextant can be temporarily attached to the clinometer and bodily adjusted thereon whilst in use.

9. In combination, a clinometer comprising a casing and a long period pendulum movable about a horizontal axis, a sextant, a holder for said sextant having a pivot substantially coincident with the oscillation axis of the pendulum and means for adjusting the holder about the axis aforesaid.

10. In combination, a clinometer comprising a casing and a long period pendulum movable about a horizontal axis, a sextant having a telescope, a holder for said sextant having a pivot substantially coincident with the oscillation axis of the pendulum, means for temporarily attaching the sextant to the holder, such attachment resulting in the eye piece of the telescope being substantially alongside the oscillation axis of the clinometer, and means for adjusting the holder about said axis.

11. In combination, a clinometer comprising a casing and a long period pendulum movable therein about a horizontal axis, such pendulum carrying a single datum "mark", a sextant having a telescope, an external holder for said sextant having a pivot substantially coincident with the oscillation axis of the pendulum and periscopic means whereby rays from the datum "mark" upon the pendulum within the casing are first diverted in a direction parallel to the oscillation axis of the pendulum and thereafter at right angles to such direction to be viewed by the telescope.

Signed at South Shields, in the county of Durham, this eighth day of November, 1922.

FRANCIS HERBERT ALEXANDER.